No. 788,161. PATENTED APR. 25, 1905.
L. MARCEAU.
CLAMP.
APPLICATION FILED JUNE 11, 1904.
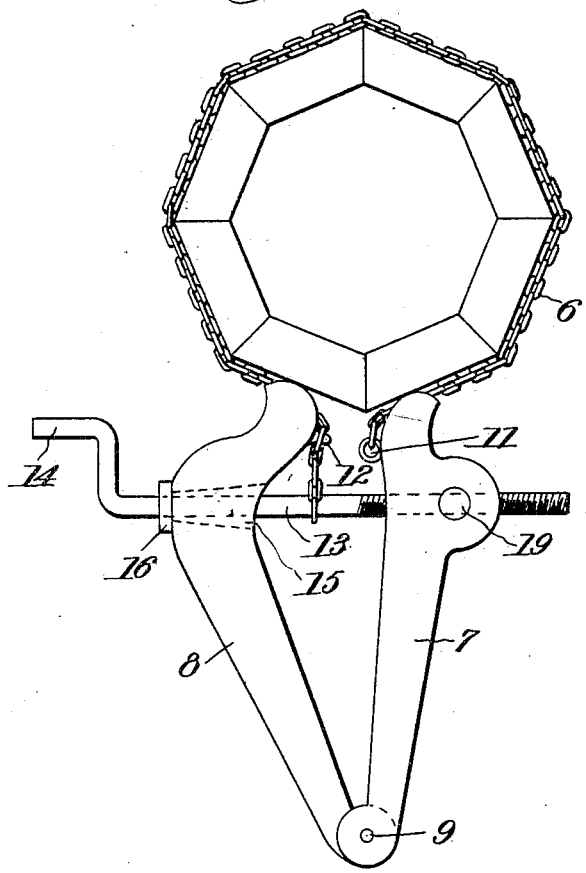
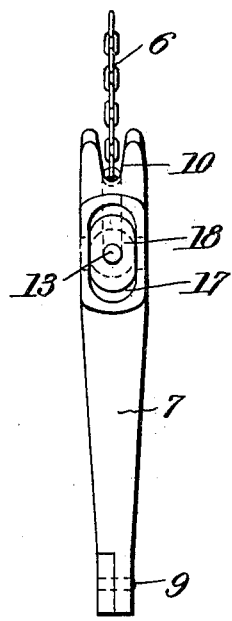
WITNESSES:
INVENTOR No. 788,161. Patented April 25, 1905.

UNITED STATES PATENT OFFICE.

LUDGER MARCEAU, OF KANKAKEE, ILLINOIS, ASSIGNOR OF ONE-HALF TO JOHN PAULISSEN, OF KANKAKEE, ILLINOIS.

CLAMP.

SPECIFICATION forming part of Letters Patent No. 788,161, dated April 25, 1905.

Application filed June 11, 1904. Serial No. 212,215.

*To all whom it may concern:*

Be it known that I, LUDGER MARCEAU, a citizen of the United States, residing at Kankakee, in the county of Kankakee and State of Illinois, have invented new and useful Improvements in Clamps, of which the following is a specification.

This invention relates particularly to a clamp used in forming and gluing wood columns or pillars made of a number of staves or sections; and the object thereof is to produce a simple and effective clamp suitable for binding together said sections. A chain is used to encircle the pillar, and its ends are attached to hooks at the ends of arms or branches, which are pivoted together and which may be drawn together to tighten the chain by means of a screw.

In the accompanying drawings, wherein the device is illustrated, Figure 1 is a plan view of the same as applied to a column. Fig. 2 is an edge view thereof.

Referring specifically to the drawings, the device for tightening the chain, which is indicated at 6, consists of two arms 7 and 8, which are hinged together at one end, as at 9, so that their outer ends may move to and from each other. At its outer end the arm 7 has a recess 10, through which the chain passes to the inner side of said arm, where it is attached to the arm by an eye 11. The outer end of the arm 8 has a similar recess through which the chain extends, and on the inner side of said arm adjacent to the recess is a projecting spur 12, over which any link of the chain may be hooked. When the chain is tightened, the extremities of the arms 7 and 8 bear against the sections of the pillar, and the strain is sufficient to hold the clamp and to prevent the same from falling off or turning out of position. The said extremities do not penetrate the wood, but will slide or move on the surface thereof as the arms are drawn together. The arms are drawn to and from each other by means of a screw 13, operated by a crank 14. This screw extends through a transverse recess 15 in the arm 8, the recess being tapered to allow the movement of the arms. The collar 16 on the screw bears behind the arm. The other arm, 7, has a transverse recess 17, in which is a nut 18, through which the threaded portion of the screw extends. This nut swivels on the pivots 19, let into the walls of the recess, to accommodate the lateral movement of the screw.

The operation is evident. The chain is passed around the pillar and its free end hooked over the spur 12. Then by means of the screw the arms are drawn together, which tightens the chain and effects the clamping action. Obviously by using a chain of sufficient length the device is capable of use on pillars of various sizes. It may be also used on square or box work or anywhere a flexible clamping device of the kind would be serviceable.

What I claim as new, and desire to secure by Letters Patent, is—

A clamp comprising a chain, arms hinged to each other at one end and having recesses in the other ends through which the chain extends, the extremities of said ends being constructed to bear slidably against the work on each side of the recesses, attaching means for the chain, on the inner side of said arms, and means to draw the arms together.

In testimony whereof I have signed my name to this specification in the presence of two subscribing witnesses.

LUDGER MARCEAU.

Witnesses:
　FREDRICK G. HENSLER,
　JOS. P. YONKE.